(12) United States Patent
Madampath

(10) Patent No.: US 10,901,767 B2
(45) Date of Patent: Jan. 26, 2021

(54) DATA LOCALITY FOR HYPERCONVERGED VIRTUAL COMPUTING PLATFORM

(71) Applicant: HEWLETT PACKARD ENTERPRISE DEVELOPMENT LP, Houston, TX (US)

(72) Inventor: Rajiv Madampath, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 174 days.

(21) Appl. No.: 15/770,063

(22) PCT Filed: Mar. 29, 2016

(86) PCT No.: PCT/US2016/024710
§ 371 (c)(1),
(2) Date: Apr. 20, 2018

(87) PCT Pub. No.: WO2017/074491
PCT Pub. Date: May 4, 2017

(65) Prior Publication Data
US 2018/0314543 A1    Nov. 1, 2018

(30) Foreign Application Priority Data
Oct. 30, 2015    (IN) .......................... 5887/CHE/2015

(51) Int. Cl.
*G06F 9/455*    (2018.01)
*G06F 17/40*    (2006.01)
(Continued)

(52) U.S. Cl.
CPC ............ *G06F 9/45558* (2013.01); *G06F 9/44* (2013.01); *G06F 9/547* (2013.01); *G06F 17/40* (2013.01);
(Continued)

(58) Field of Classification Search
CPC ........ G06F 9/45558; G06F 9/44; G06F 9/547; G06F 17/40
See application file for complete search history.

(56) References Cited

U.S. PATENT DOCUMENTS 7,596,712 B1 * 9/2009 Gole ....................... G06F 3/061
                                                          711/141
7,721,044 B1   5/2010 Chatterjee et al.
(Continued)

FOREIGN PATENT DOCUMENTS

WO    2017/074491 A1    5/2017

OTHER PUBLICATIONS

Ankur Agrrawal et al., "File System Aware Storage Virtuaiization Management," Oct. 2012, pp. 1-11, IEEE.
(Continued)

*Primary Examiner* — Tammy E Lee
(74) *Attorney, Agent, or Firm* — Hewlett Packard Enterprise Patent Department

(57) ABSTRACT

In one example, a method of data localization in a hyper-converged virtual computing platform is described, which includes, determining whether a logical block address (LBA) associated with a storage request received by a node maps to another one of the plurality of nodes. The page associated with the storage request is then migrated from the other one of the plurality of nodes to the node based on a recent page hit count associated with the storage request when the LBA associated with the storage request is from another one of the plurality of nodes. Mapping layers residing in each of the plurality of nodes including the remapped LBA associated with the storage request are then updated. The storage request is resolved at the node if the LBA associated with the storage is found in the updated mapping layer associated with the node.

19 Claims, 5 Drawing Sheets

(51) Int. Cl.
*G06F 9/44* (2018.01)
*G06F 9/54* (2006.01)
(52) U.S. Cl.
CPC ......... *G06F 2009/4557* (2013.01); *G06F 2009/45579* (2013.01); *G06F 2009/45583* (2013.01)

(56) References Cited

U.S. PATENT DOCUMENTS

| | | | |
|---|---|---|---|
| 8,527,735 B2 | 9/2013 | Ryu et al. | |
| 8,601,473 B1* | 12/2013 | Aron | G06F 9/5088 718/1 |
| 8,924,472 B1 | 12/2014 | Luciani | |
| 8,935,493 B1 | 1/2015 | Dolan et al. | |
| 8,972,986 B2 | 3/2015 | Palanisamy et al. | |
| 9,032,069 B2 | 5/2015 | Van Biljon et al. | |
| 9,645,943 B2 | 5/2017 | Kopylovitz et al. | |
| 2005/0055603 A1* | 3/2005 | Soran | G06F 3/0608 714/6.32 |
| 2008/0228992 A1* | 9/2008 | Dumitru | G06F 3/0613 711/100 |
| 2011/0276963 A1 | 11/2011 | Wu et al. | |
| 2012/0272029 A1* | 10/2012 | Zhang | G06F 11/3466 711/165 |
| 2013/0125122 A1 | 5/2013 | Hansen | |
| 2013/0332700 A1* | 12/2013 | Kopylovitz | G06F 3/0631 711/209 |
| 2014/0059310 A1 | 2/2014 | Du et al. | |
| 2014/0165062 A1 | 6/2014 | Buragohain et al. | |
| 2015/0234669 A1 | 8/2015 | Ben-Yehuda et al. | |
| 2015/0248402 A1 | 9/2015 | Patterson et al. | |
| 2015/0281358 A1 | 10/2015 | Umbehocker et al. | |

OTHER PUBLICATIONS

Brian Suhr, "Hyper-Converged Infrastructure Comparison, Nutanix vs SimpliVity vs EVO:RAIL," Oct. 21, 2014, pp. 1-37 (online), Data Center Zombie, Retrieved from the Internet on Apr. 19, 2018 at URL: <datacenterzombie.com/hyper-converged-infrastructure-comparison/>.
International Search Report and Written Opinion, International Application No. PCT/US2016/024710, dated Jul. 7, 2016, pp. 1-8, KIPO.
Starwind Software, Inc., "StarWind Virtual SAN® Free," Nov. 18, 2015, pp. 1-6 (online), Retrieved from the Internet on Aug. 29, 2016 at URL: <starwindsoftware.com/starwind-virtual-san-free>.
Steven Poitras, "The Nutanix Bible," 2016, pp. 1-164, Nutanix.
Wikipedia, "Inode pointer structure," Sep. 5, 2015, pp. 1-2 (online), Retrieved from the Internet on Jun. 6, 2017 at URL: <en.wikipedia.org/w/index.php?title=Inode_pointer_structure&oldid=679657943>.
International Preliminary Report on Patentability received for PCT Patent Application No. PCT/US2016/024710, dated May 11, 2018, 7 pages.

* cited by examiner

DATA LOCALITY FOR HYPERCONVERGED VIRTUAL COMPUTING PLATFORM

BACKGROUND

Hyperconverged virtual computing platform is a storage and compute solution, i.e., it is a bundled hardware and software solution, which houses multiple nodes. Hyperconverged virtual computing platform may have the ability to incrementally scale storage and compute with linear increases to performance and ability.

BRIEF DESCRIPTION OF THE DRAWINGS

Examples are described in the following detailed description and in reference to the drawings, in which.

DETAILED DESCRIPTION

Figure 1:
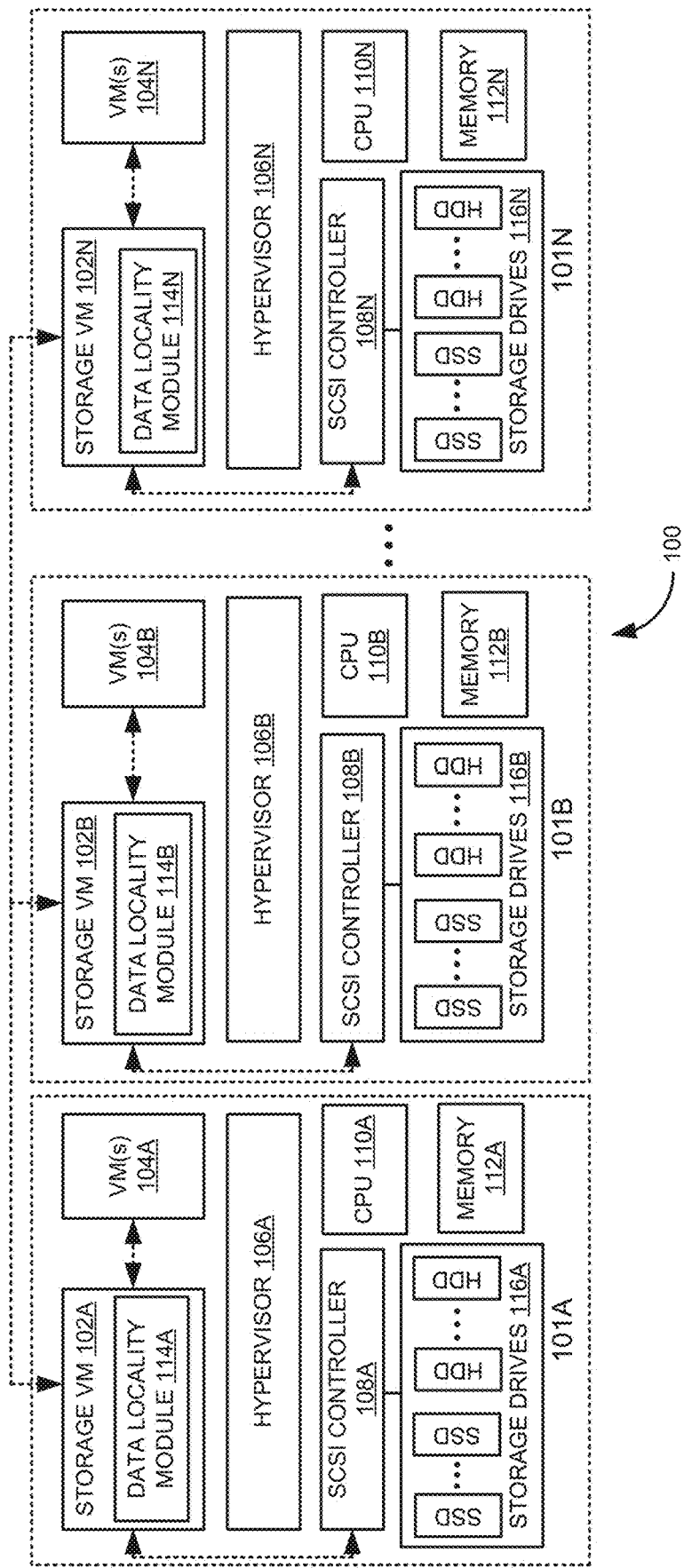
FIG. 1 illustrates an example block diagram of data locality architecture implemented in a hyperconverged virtual computing platform.

Hyperconverged virtual computing platforms rely on data locality for improved operational performance. Hyperconverged virtual computing platform is a storage and compute solution, i.e., it is a bundled hardware and software solution, which houses multiple nodes. Data locality may help alleviate the bottlenecks/overheads traditionally required when going over the network to fetch a requested volume data. Hyperconverged virtual computing platforms may have ability to incrementally scale storage and compute with linear increases to performance and ability. However, use of fixed node-based volume data distribution across all cluster nodes in hyperconverged virtual computing platforms may inhibit data locality, which may result in operational performance disadvantages.

For example, in a hyperconverged virtual computing platform, when a virtual machine (VM) that is co-located with storage VM in a node frequently requests for a volume data, and if the logical block address (LBA) associated with the requested volume data may map to a different node. In such a scenario, the request maybe forwarded to the other node via remote procedure call (RPC) using a modulo-based approach, which may result in operational performance disadvantage as the requested data is locally not available to the node.

Further for example, if the LBA for a request of volume data maps to a different virtual storage appliance (VSA) node, the request for volume data may be forwarded to an appropriate VSA and the volume data maybe served by that VSA in the RPA reply. Such RPC calls that require going over a network and going through another VSA maybe taxing on operating performance and reduce input/output operations per second (IOPS), which can also be one of the service level agreements (SLAs) of a storage array.

To address these issues, the present specification describes various examples for facilitating data availability in a hyperconverged virtual computing environment. In an example, the proposed solution includes a mapping layer in each VSA, which keeps track of LBA to remapped LBA on top of the current mapping. In one example, the current map maintains and uses modulo arithmetic on the incoming LBA to determine the VSA node that the LBA maps to and forwards the rest to that node. The proposed solution in the specification describes adding the mapping layer which is first consulted by a VSA node before falling back to using the current map before forwarding the LBA request. In operation, the proposed technique initially starts with the existing map as the new map in each VSA is empty. When an LBA request to a VSA1 node, which may map to VSA2 node, a page of the same volume data on the VSA1 node is selected, which are swapped with the contents of the page corresponding to the requested LBA on VSA2 node to provide data locality. In an example, the decision of whether to swap the contents maybe done based on a recent page hit count, which maybe further based on a periodically updated daemon page statistics periodically to keep track of the current page usage patterns.

In the following description, for purposes of explanation, numerous specific details are set forth in order to provide a thorough understanding of the present techniques. It will be apparent, however, to one skilled in the art that the present apparatus, devices and systems maybe practiced without these specific details. Reference in the specification to "an example" or similar language means that a particular feature, structure, or characteristic described is included in at least that one example, but not necessarily in other examples.

Turning now to the figures, FIG. 1 illustrates an example block diagram of data locality implementation in a hyperconverged virtual computing platform 100 As shown in FIG. 1, hyperconverged virtual computing platform 100 may include a plurality of nodes A-N.

In an example, a plurality of nodes A-N implements a virtualization environment and may comprise associated hypervisors 106 A-N and multiple VMs 104 A-N. Further in the example, a plurality of storage devices 116 A-N is accessed by VMs 104 A-N. Furthermore in the example, plurality of nodes A-N may comprise associated storage VMs 102 A-N implemented as service VMs to manage access by the VMs 104 A-N to storage devices 116 A-N. Each of the associated service VMs 102A-N is dedicated to its associated each of plurality of nodes 101 A-N. The service VM on each node may run as a VM above the hypervisor, and further the service VM in each node may manage a storage disk coupled to the multiple VMs Also in the example, storage VMs 102 A-N may include associated data locality modules 114 A-N. In addition in the example, storage devices 116 A-N may comprise associated SCSI controllers 108 A-N. Plurality of nodes A-N may include associated CPUs 110 A-N and memory 112 A-N. Storage VMs 102 A-N maybe communicatively coupled to associated SCSI controllers 108 A-N. Further, plurality of nodes 101 A-N maybe communicatively coupled via storage VMs 102 A-N. In an instance, a request for storage is managed by a service VM at a node is handled by the service VM at the node. In an example, an IP-based protocol maybe utilized to communicate the internal network traffic with the service VM. The IP-based protocol maybe an Internet Small Computer System Interface (iSCSI) protocol In an example operation, in response to determining a storage request received from one of a plurality of nodes in the hyperconverged virtual computing platform maybe resolved based on a mapping layer residing in the node. Further, the mapping layer includes remapped LBA associated with each received storage request in the hyperconverged virtual computing platform, such as those shown in FIG. 2 that is based on a recent page hit count associated with the storage request. In an example, the recent page hit count maybe based on a clock statistical function, such as a periodically updated daemon updated page statistics. Example storage requests are read/write requests and/or input/output (I/O) requests.

In an example, the mapping layer in each one of plurality of storage VMs 102 A-N keeps a mapping of LBA to remapped LBA on top of the current mapping. The current mapping simply executes modulo-arithmetic on an incoming LBA to determine the storage VM node that the LBA maps to and forwards the request to that node. In this example, the proposed mapping layer is first consulted by any of the plurality of storage VMs 102 V-Ms before falling back to the current mapping scheme for determining the storage VM node that the LBA maps to and forwards the request to that node.

In an example, each of data locality modules 114 A-N determines whether an LBA associated with a storage request received from associated one of plurality of nodes 101 A-N maps to another one of the plurality of nodes 101 A-N in the hyperconverged virtual computing platform 100.

Based on the outcome of the determination, if the storage request maps to another one of the plurality of nodes 101 A-N, then the associated one or data locality modules 114 A-N, forwards the storage request via a remote procedure call (RPC) to the other one of the plurality of nodes 101 A-N to resolve the storage request. In an example, if the storage request does not map to the other one of the plurality of nodes 101 A-N, i.e., the mapping layer does not contain an entry for this LBA, then the other one of the plurality of nodes 101 A-N associated with the storage request is determined using a modulo based approach.

Figure 2:
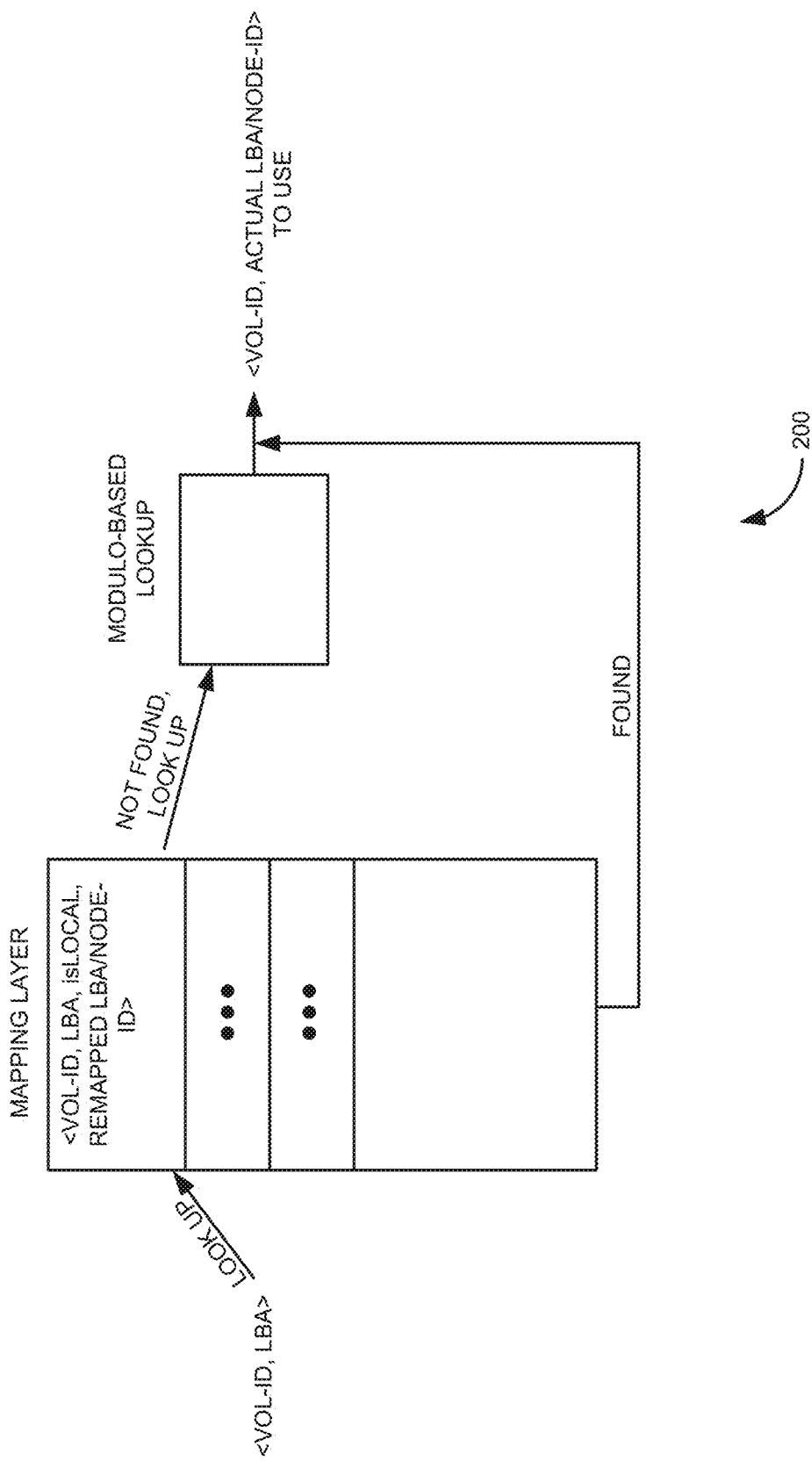
FIG. 2 is a block diagram showing an example look-up table data structure used in the data locality architecture, such as those shown in FIG. 1, according to one aspect of the present subject matter.

Further, the associated one of the data locality modules 114 A-N, migrates the page associated with the storage request from the other one of the plurality of nodes 101 A-N to the node based on a recent page hit count associated with the storage request. This is shown in more detail in Example flowchart shown in FIG. 3. Furthermore, mapping layer, such as shown in FIG. 2, residing in each of the plurality of nodes is updated to include the remapped LBA or node ID associated with the storage request. In an example, if isLocal is not set, the node ID field is used for sending the RPC to get the data served from a remote node.

The associated one of the data locality modules 114 A-N resolves the storage request at the node if the LBA associated with the storage is found in the updated mapping layer associated with the node. The associated one of the data locality modules 114 A-N then repeats the above proposed technique for a next storage request. In an example, if isLocal is set, the remapped LBA field is used for serving the data locally.

In one example, each of the digital locality modules 114 A-N start the operation of the hyperconverged virtual computing platform with an empty mapping layer in each of the plurality of nodes. Further, during operation the each of the digital locality modules 114 A-N build and update the mapping layer during operation based on the recent page hit count associated with each storage request.

Figure 3:
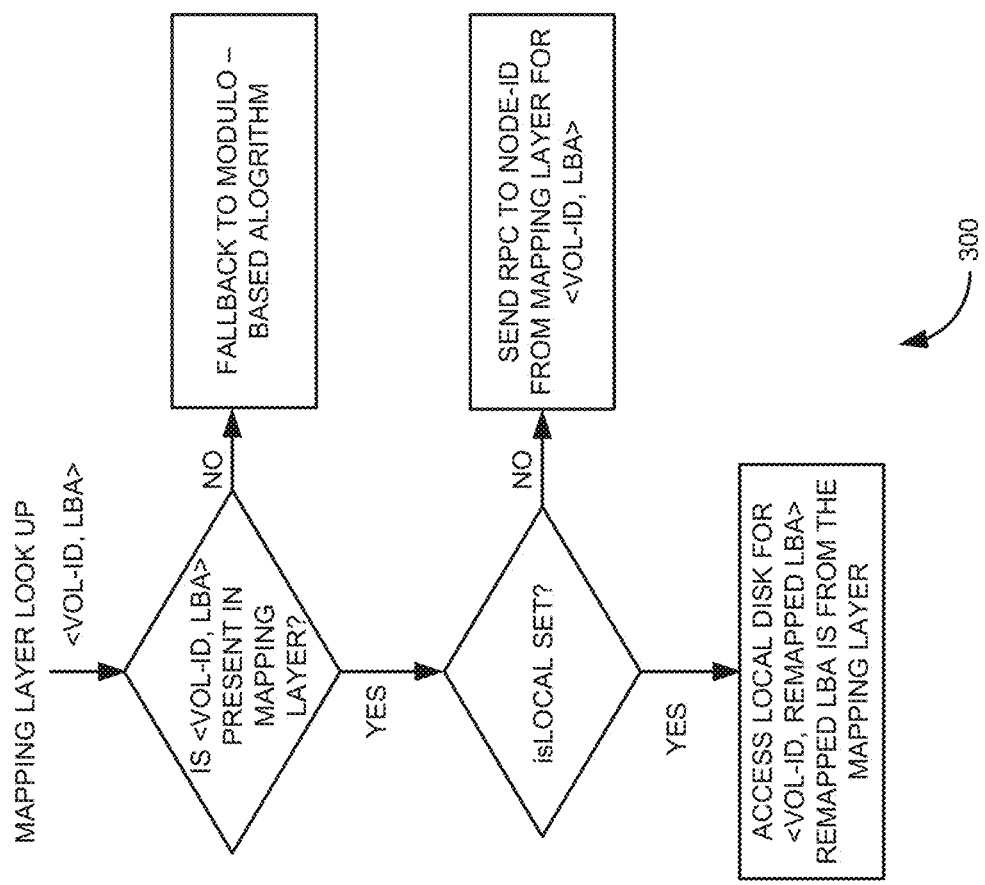
FIG. 3 depicts a flow chart of an example method for data localization in a hyperconverged virtual computing platform, such as those shown in FIG. 1.

In an example, one of the digital locality modules 114 A-N residing in the associated one of the nodes 101 A-N associated with the storage request sends recent page hit count along with an RPC request when the storage request maps to another node in the plurality of nodes 101 A-N. One of the digital locality modules 114 A-N then compares the received recent page hit count sent by the node with the recent page hit count in the other node. One of the digital locality modules 114 A-N then migrates the page associated with the storage request from the other node to the node. One of the digital locality modules 114 A-N then issues a synchronization command by the node upon migrating the page to all the other nodes in the plurality of nodes. One of the digital locality modules 114 A-N then updates mapping layers residing in each of the plurality of nodes by including remapped LBA or node ID upon receiving the synchronization command. FIG. 3 shows one example data locality implementation in hyperconverged virtual computing platform.

In an instance, initially, all storage VMs 102 A-N may rely on current mapping scheme of using modulo-arithmetic for on an incoming LBA to determine the storage VM node that the LBA maps to and forwards the request to that node. Further, initially when starting, the mapping layer may be empty in each storage VM. For example, when an LBA request comes on storage VM 102A which may map to storage VM 102B, a page (maybe referred to as victimPAGE) of the same volume on the storage VM 102A is selected (based on LRU or its variants), which may now be swapped with the contents of the page corresponding to the requested LBA on storage VM 102B (maybe referred to as IbaPAGE) to improve data locality. The decision of whether the swapping should be performed maybe based on a recent page hit count which could be based on a clock algorithm used in memory subsystem, in which a daemon may update page statistics periodically to keep track of current page usage patterns.

In an instance, storage VM 102A may first send a recent page hit count of a page to storage VM 102B in an RPC request along with the other parameters storage VM 102A may normally send when a requested LBA maps to a different storage VM. If storage VM 102B sees that the recent page hit count that storage VM 102A sent is greater than storage VM 102B's own recent page hit count for IbaPAGE, then storage VM 102B may attempt to migrate the page to storage VM 102A. As part of this, storage VM 102B may send an intermediate RPC request to storage VM 102A for the contents of victimPAGE. Storage VM 102A may then send the contents of victimPAGE to storage VM 102B. In such an example scenario, the associated data locality modules 1114 A and 114B may then perform the following steps as an automated transaction:

1. Storage VM 102B receives the contents of victimPAGE, reads the contents of IbaPAGE into memory and then writes out the contents of victimPAGE into the location of IbaPAGE.
2. Storage VM 102B populates its mapping layer to reflect the new mapping for IbaPAGE and victimPAGE. In this instance, the 2 entries maybe updated—the entry for IbaPAGE may now point to storage VM 102A and the entry for victimPAGE may now point to the page number for IbaPAGE.
3. Storage VM 102B may send the contents of IbaPAGE to storage VM 102A.

4. Storage VM 102A copies the contents of IbaPAGE to the location of victimPAGE and updates its mapping for IbaPAGE and victimPAGE, thus completing the swap/migrate operation.
5. Storage VM 102A may now issue a synchronization to ensure that the mapping layer maps to IbaPAGE and victimPAGE are updated on all the mapping layers residing in storage VMs 102A-N so that any new request for these remapped pages are forwarded to the appropriate storage VM. The mapping layer in the proposed solution is part of each storage VM node's local metadata that maybe kept persistent. With this proposed solution, the modified mapping layer entries are propagated to other storage VMs.

Further in this example scenario, any new request on any storage VM thereafter for an IbaPAGE may then resolve to storage VM102A, because the mapping layer is first consulted by each storage VM before using the current scheme of modulo-algebraic function. Any storage VM may then see the remapped location of IbaPAGE in mapping layer and may then send an RPC request to storage VM 102A. Furthermore in this example scenario, storage VMs 102 A-N may not attempt to migrate IbaPAGE local storage unless as described above, their recent page hit count for IbaPAGE is greater than the page hit count of IbaPAGE on the remote storage VM where the IbaPAGE maybe currently hosted.

The above proposed solution may not increase a global database (GDB) size, but may decrease the number of RPCs, which may be performed overall by adding a relatively small overhead of per-node mapping layers and consulting mapping layer for each incoming storage request. The number of RPCs performed maybe a factor which limits the true scale-out feature and performance of locality hyperconverged virtual computing platform. Thus, may improve data locality and reduce the number of RPCs, which may in turn improve the core metrics of scalability, which may further in turn improve the core metrics of scalability and performance of the hyperconverged virtual computing platform.

Figure 4:
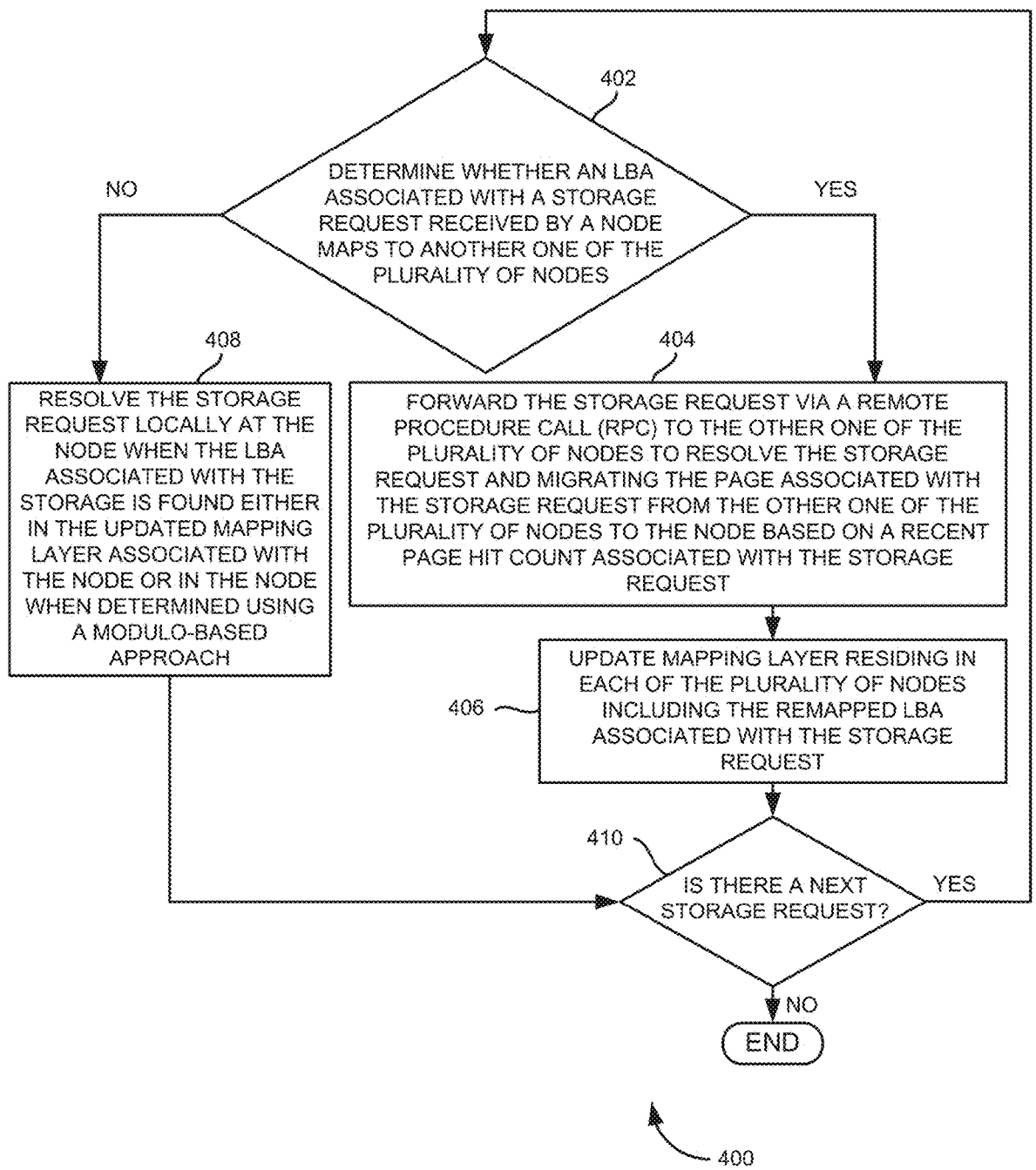
FIG. 4 depicts another flow chart of an example method for data localization in a hyperconverged virtual computing platform, such as those shown in FIG. 1.

FIG. 4 is a block diagram of an example method 400 for data locality in an hyperconverged virtual computing platform. The method 400, which is described below, may be partially executed on an hyperconverged virtual computing platform, such as those shown in FIG. 1. However, other suitable computing systems and devices may execute method 400 as well. At block 402, each data locality module associated with a storage request received by a node determines whether an LBA associated with a storage request received by a node maps to another one of the plurality of nodes. At block 404, the storage request is forwarded via a remote procedure call (RPC) to the other one of the plurality of nodes to resolve the storage request and further the page associated with the storage request is migrated from the other one of the plurality of nodes to the node based on a recent page hit count associated with the storage request if the storage request is associated with the other one of the plurality of nodes. At block 406, mapping layer residing in each of the plurality of nodes including the remapped LBA associated with the storage request is updated. At block 408, the storage request is resolved locally at the node when the LBA associated with the storage is either found in the updated mapping layer associated with the node or the LBA is determined to be present at the node when using the modulo-based approach. At block 410, the method 400 goes back to block 402 and repeats the process outlined in blocks 402-410 for another received storage request, otherwise the method 400 ends the process outlined in blocks 402-210.

In one example, the method 400 starts the operation of the hyperconverged virtual computing platform with an empty mapping layer in each of the plurality of nodes. The mapping layer is then built and updated during operation based on the recent page hit count associated with each storage request.

In one example, the method 400 sends a recent page hit count along with an RPC request associated with the storage request by the node when the storage request maps to another node in the plurality of nodes. The received recent page hit count sent by the node is then compared with the recent page hit count in the other node. The page associated with the storage request is then migrated from the other node to the node. Further issues a synchronization command by the node upon migrating the page to all the other nodes in the plurality of nodes. Mapping layers residing in each of the plurality of nodes are then updated by including remapped LBA upon receiving the synchronization command.

Figure 5:
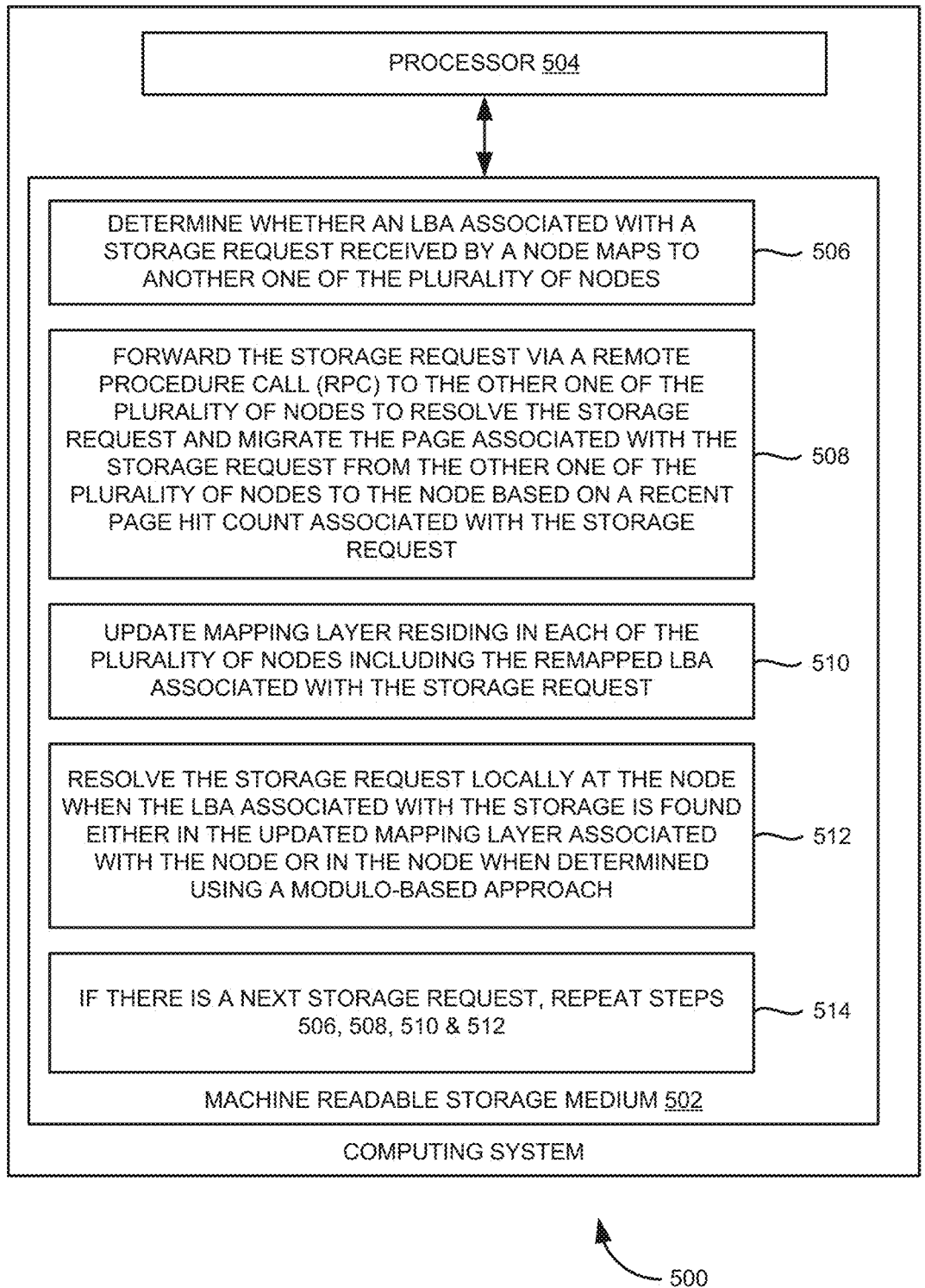
FIG. 5 is an example block diagram showing a non-transitory computer-readable medium for data localization in hyperconverged virtual computing platform.

FIG. 5 is an example block diagram showing a non-transitory computer-readable medium that stores code for operation in accordance with an example of the techniques of the present application. The non-transitory computer-readable medium is generally referred to by the reference number 502 and maybe included in a computing system 500 in relation to FIG. 1. The terms "non-transitory computer-readable medium" and "machine readable storage medium" are used interchangeably throughout the document. The non-transitory computer-readable medium 502 may correspond to any storage device that stores computer-implemented instructions, such as programming code or the like. For example, the non-transitory computer-readable medium 502 may include non-volatile memory, volatile memory, and/or storage devices. Examples of non-volatile memory include, but are not limited to, electrically erasable programmable Read Only Memory (EEPROM) and Read Only Memory (ROM). Examples of volatile memory include, but are not limited to, Static Random Access Memory (SRAM), and dynamic Random Access Memory (DRAM). Examples of storage devices include, but are not limited to, hard disk drives, compact disc drives, digital versatile disc drives, optical drives, and flash memory devices.

A processor 504 generally retrieves and executes the instructions stored in the non-transitory computer-readable medium 502 to operate the present techniques in accordance with an example. In one example, the tangible, computer-readable medium 502 can be accessed by the processor 504 over a bus.

The machine-readable storage medium 502 may store instructions 506-514. In an example, instructions 506-514 maybe executed by the processor 504 to provide a mechanism for data locality in hyperconverged virtual computing platform. Instructions 506 maybe executed by the processor 504 to determine whether an LBA associated with a storage request received by a node maps to another one of the plurality of nodes. Instructions 508 maybe executed by the processor 504 to forwarded the storage request via a remote procedure call (RPC) to the other one of the plurality of nodes to resolve the storage request and further the page associated with the storage request is migrated from the other one of the plurality of nodes to the node based on a recent page hit count associated with the storage request if the storage request is associated with the other one of the plurality of nodes. Instructions 510 maybe executed by the processor 504, to update the mapping layer residing in each of the plurality of nodes including the remapped LBA associated with the storage request. Instructions 512 maybe executed by the processor 504, to resolve the storage request at the node when the LBA associated with the storage is found in the updated mapping layer associated with the node. Instructions 514 maybe executed by the processor 504, to go back to instructions 506 and repeat the instructions outlined in 506-514 for a next received storage request.

Although shown as contiguous blocks, the machine readable instructions can be stored in any order or configuration. For example, if the non-transitory computer-readable medium 502 is a hard drive, the machine readable instructions can be stored in non-contiguous, or even overlapping, sectors.

As used herein, a "processor" may include processor resources such as at least one of a Central Processing Unit (CPU), a semiconductor-based microprocessor, a Graphics Processing Unit (GPU), a Field-Programmable Gate Array (FPGA) to retrieve and execute instructions, other electronic circuitry suitable for the retrieval and execution instructions stored on a computer-readable medium, or a combination thereof. The processor fetches, decodes, and executes instructions stored on computer-readable medium 502 to perform the functionalities described below. In other examples, the functionalities of any of the instructions of computer-readable medium 502 may be implemented in the form of electronic circuitry, in the form of executable instructions encoded on a computer-readable storage medium, or a combination thereof.

As used herein, a "computer-readable medium" maybe any electronic, magnetic, optical, or other physical storage apparatus to contain or store information such as executable instructions, data, and the like. For example, any computer-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any computer-readable medium described herein may be non-transitory. In examples described herein, a computer-readable medium or media is part of an article (or article of manufacture). An article or article of manufacture may refer to any manufactured single component or multiple components. The medium maybe located either in the system executing the computer-readable instructions, or remote from but accessible to the system (e.g., via a computer network) for execution. In the example of FIG. 5, computer-readable medium 502 may be implemented by one computer-readable medium, or multiple computer-readable media.

In examples described herein, the source storage system may communicate with the destination storage system via a network interface device. Further, in examples described herein, the source storage nodes may communicate with each other via a network interface device. Furthermore, the destination storage nodes may communicate with each other via a network interface device. In examples described herein, a "network interface device" maybe a hardware device to communicate over at least one computer network. In some examples, network interface maybe a Network Interface Card (NIC) or the like. As used herein, a computer network may include, for example, a Local Area Network (LAN), a Wireless Local Area Network (WLAN), a Virtual Private Network (VPN), the Internet, or the like, or a combination thereof. In some examples, a computer network may include a telephone network (e.g., a cellular telephone network).

In some examples, instructions maybe part of an installation package that, when installed, maybe executed by processor 504 to implement the functionalities described herein in relation to instructions. In such examples, computer-readable medium 502 maybe a portable medium, such as a CD, DVD, or flash drive, or a memory maintained by a server from which the installation package can be downloaded and installed. In other examples, instructions maybe part of an application, applications, or component(s) already installed on the computing system 500 including processor 504. In such examples, the computer-readable medium 502 may include memory such as a hard drive, solid state drive, or the like. In some examples, functionalities described herein in relation to FIGS. 1 through 5 maybe provided in combination with functionalities described herein in relation to any of FIGS. 1 through 5.

The example methods and systems described through FIGS. 1-5 may enable data locality in hyperconverged virtual computing platform. The example methods and systems described through FIGS. 1-5 may provide efficient data locality in hyperconverged virtual computing platform. The example methods and systems described through FIGS. 1-5 may also provide regular optimization of data locality in hyperconverged virtual computing platform.

It may be noted that the above-described examples of the present solution are for the purpose of illustration only. Although the solution has been described in conjunction with a specific embodiment thereof, numerous modifications maybe possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, maybe combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system for data localization in a hyperconverged virtual computing platform, comprising:
   a plurality of nodes, wherein the plurality of nodes implements a virtualization environment, and comprises a hypervisor and multiple virtual machines (VMs); and
   a storage VM on each node to manage access by the multiple VMs to a plurality of storage devices,
   wherein each storage VM is dedicated to an associated node, and
   wherein a storage request managed by a storage VM at a node is handled by the storage VM at the node, the node including a processor and a non-transitory computer-readable medium having computer executable instructions stored thereon, the instructions executable by the processor to:
      resolve the storage request received from a first node of a plurality of nodes in the hyperconverged virtual computing platform based on a mapping layer residing in the first node, wherein the mapping layer includes remapped logical block addresses associated with respective storage requests in the hyperconverged virtual computing platform that are based on recent page hit counts associated with the storage requests, and the remapped logical block addresses map among the plurality of nodes and determine from the mapping layer whether a logical block address (LBA) associated with the storage request received by the first node maps to another node of the plurality of nodes according to a remapped LBA associated with the storage request;

if the LBA associated with the storage request maps to another node of the plurality of nodes, forward the storage request via a remote procedure call (RPC) to the other node of the plurality of nodes to resolve the storage request and migrate a page associated with the storage request from the other node of the plurality of nodes to the first node based on a recent page hit count associated with the storage request;

update mapping layers residing respectively in each of the plurality of nodes with the remapped LBA associated with the storage request; and if the LBA associated with the storage request does not map to another node of the plurality of nodes, resolve the storage request at the first node when the LBA associated with the storage is found in the mapping layer residing in the first node.

2. The system of claim 1, wherein the non-transitory computer-readable medium further stores computer executable instructions executable by the processor to:

start operation of the hyperconverged virtual computing platform with the mapping layers residing respectively in each of the plurality of nodes being empty; and build and update the mapping layers during operation based on recent page hit counts associated with storage requests.

3. The system of claim 2, wherein the non-transitory computer-readable medium further stores computer executable instructions executable by the processor to:

send the recent page hit count along with the RPC by which the storage request is forwarded, wherein the other node compare the recent page hit count sent by the first node to a recent page hit count in the other node;

migrate the page associated with the storage request from the other node to the selected node;

issue a synchronization command by the first node upon migrating the page to all other nodes in the plurality of nodes; and update mapping layers residing respectively in each of the plurality of nodes by including remapped logical block address upon receiving the synchronization command.

4. The system of claim 3, wherein the recent page hit count is based on a clock statistical function.

5. The system of claim 3, wherein an IP-based protocol is utilized to communicate internal network traffic with the storage VM, and wherein the IP-based protocol is an Internet Small Computer System Interface (iSCSI) protocol.

6. The system of claim 3, wherein the storage VM on each node runs as a VM above the hypervisor, and wherein the storage VM in each node manages a storage disk coupled to the multiple VMs.

7. The system of claim 1, wherein the storage request is an input/output (I/O) request.

8. A method of data localization in a hyperconverged virtual computing platform, comprising:

resolving a storage request received from a first node of a plurality of nodes in the hyperconverged virtual computing platform based on a mapping layer residing in the first node, wherein the resolving includes:

determining from the mapping layer whether a logical block address (LBA) associated with the storage request received by the first node maps to another node of the plurality of nodes, if the LBA associated with the storage request maps to another node of the plurality of nodes, forwarding the storage request via a remote procedure call (RPC) to the other node of the plurality of nodes to resolve the request and migrating a page associated with the storage request from the other node of the plurality of nodes to the first node based on a recent page hit count associated with the storage request, updating mapping layers residing respectively in each of the plurality of nodes with the remapped LBA associated with the storage request, and if the LBA associated with the storage request does not map to another node of the plurality of nodes, resolving the storage request at the first node when the LBA associated with the storage is found in the mapping layer residing in the first node; and wherein each node in the plurality of nodes implements a virtualization environment and comprises a hypervisor and multiple virtual machines (VMs), wherein the hyperconverged virtual computing platform further includes access to a plurality of storage devices that are accessed by the multiple VMs, and wherein the mapping layer includes remapped logical block addresses associated with respective storage requests in the hyperconverged virtual computing platform that are based on recent page hit counts associated with the storage requests, and the remapped logical block addresses map among the plurality of nodes.

9. The method of claim 8, further comprising:

starting operation of the hyperconverged virtual computing platform with the mapping layers residing respectively in each of the plurality of nodes being empty; and building and updating the mapping layers during operation based on recent page hit counts associated with storage requests.

10. The method of claim 8, wherein updating mapping layers residing in each of the plurality of nodes by including the remapped LBA associated with the storage request, comprises:

sending the recent page hit count along with the RPC by which the storage request is forwarded, wherein the other node compares the recent page hit count sent by the first node with the RPC to a recent page hit count in the other node;

migrating the page associated with the storage request from the other node to the first node;

issuing a synchronization command by the first node upon migrating the page to all other nodes in the plurality of nodes; and updating mapping layers residing respectively in each of the plurality of nodes by including remapped logical block address upon receiving the synchronization command.

11. A non-transitory computer-readable medium having computer executable instructions stored thereon for data localization in a hyperconverged virtual computing platform, the instructions are executable by a processor to:

resolve a storage request received from a first node of a plurality of nodes in the hyperconverged virtual computing platform based on a mapping layer residing in the first node, wherein each node implements a virtualization environment and comprises a hypervisor and multiple virtual machines (VMs), wherein the hyperconverged virtual computing platform further includes access to a plurality of storage devices that are accessed by the multiple VMs, wherein the mapping layer includes remapped logical block addresses associated with respective storage requests in the hyperconverged virtual computing platform that are based on recent page hit counts associated with the storage requests, and the remapped logical block addresses map among the plurality of nodes; and determining from the mapping layer whether a logical block address (LBA) associated with the storage request received by the first node maps to another node of the plurality of nodes;

if the LBA associated with the storage request maps to another node of the plurality of nodes, forward the storage request via a remote procedure call (RPC) to the other node of the plurality of nodes to resolve the storage request and migrating a page associated with the storage request from the other node of the plurality of nodes to the first node based on a recent page hit count associated with the storage request;

updating mapping layers residing respectively in each of the plurality of nodes with the remapped LBA associated with the storage request; and if the LBA associated with the storage request does not map to another node of the plurality of nodes, resolving the storage request at the first node when the LBA associated with the storage is found in the mapping layer residing in the first node.

12. The non-transitory computer-readable medium of claim 11, wherein the instructions are executable by the processor to:

starting operation of the hyperconverged virtual computing platform with the mapping layers residing respectively in each of the plurality of nodes being empty; and building and updating the mapping layers during operation based on recent page hit counts associated with storage requests.

13. The non-transitory computer-readable medium of claim 11, wherein the instructions are executable by the processor to:

send the recent page hit count along with the RPC by which the storage request is forwarded, wherein the other node compares the recent page hit count sent by the first node with the RPC to a recent page hit count in the other node;

migrate the page associated with the storage request from the other node to the first node;

issue a synchronization command by the first node upon migrating the page to all other nodes in the plurality of nodes; and update mapping layers residing respectively in each of the plurality of nodes by including remapped logical block address upon receiving the synchronization command.

14. The system of claim 1, wherein the data locality module is to respond to the LBA associated with the storage request not mapping to another node of the plurality of nodes and not being found in the mapping layer residing in the first node by using a modulo-arithmetic on the LBA associated with the storage request to determine to which node of the plurality of nodes the storage request is to be forwarded.

15. The method of claim 8, further comprising responding to the LBA associated with the storage request not mapping to another node of the plurality of nodes and not being found in the mapping layer residing in the first node by using a modulo-arithmetic on the LBA associated with the storage request to determine to which node of the plurality of nodes the storage request is to be forwarded.

16. The non-transitory computer-readable medium of claim 11, wherein the instructions are executable by the processor to respond to the LBA associated with the storage request not mapping to another node of the plurality of nodes and not being found in the mapping layer residing in the first node by using a modulo-arithmetic on the LBA associated with the storage request to determine to which node of the plurality of nodes the storage request is to be forwarded.

17. The non-transitory computer-readable medium of claim 13, wherein the recent page hit count is based on a clock statistical function.

18. The non-transitory computer-readable medium of claim 13, wherein an IP-based protocol is utilized to communicate internal network traffic with the storage VM, and wherein the IP-based protocol is an Internet Small Computer System Interface (iSCSI) protocol.

19. The non-transitory computer-readable medium of claim 13, wherein the storage VM on each node runs as a VM above the hypervisor, and wherein the storage VM in each node manages a storage disk coupled to the multiple VMs.

* * * * *